March 7, 1961  S. C. JEFFUS  2,973,882
POCKET GUM CASE
Filed March 27, 1959

INVENTOR.
Samuel C. Jeffus
BY Victor J. Evans & Co.
ATTORNEYS

United States Patent Office 2,973,882
Patented Mar. 7, 1961

2,973,882

POCKET GUM CASE

Samuel C. Jeffus, Detroit, Mich.
(10275 Talladay Road, Willis, Mich.)

Filed Mar. 27, 1959, Ser. No. 802,456

3 Claims. (Cl. 221—228)

This invention relates to containers and particularly pocket containers for chewing gum and the like, and in particular a small rectangular-shaped case approximately the size of a package of chewing gum, and having a spring for urging cakes or strips of chewing gum upwardly in the case, and a sliding cover with a thumb engaging button on the outer surface and a lug on the inner surface whereby in sliding the cover toward a discharge end of the case the lug engages the end of a cake or strip of chewing gum and slides the cake or strip through a discharge opening in the end of the case.

The purpose of this invention is to provide a case for protecting chewing gum and which facilitates removing a single cake or strip of gum with each dispensing action.

Packages of chewing gum are carried in pockets and in instances where a child is engaged in playing football, basketball, baseball, or the like, particularly after school, a package of chewing gum in a pocket is subjected to abuse and the cakes or strips are readily broken. Furthermore, after such abuse it is sometimes difficult to remove a single cake or strip from a package. With this thought in mind this invention contemplates a small case having a sliding cover in which a plurality of cakes or strips of chewing gum, such as five cakes or strips may be positioned and wherein the parts are arranged so that with each movement of the cover a single strip or cake is discharged from the case.

The object of this invention is, therefore, to provide a chewing gum carrying and dispensing case that is designed to be carried in a pocket and from which single cakes or strips of chewing gum are readily discharged.

Another object of the invention is to provide a small plastic case for dispensing chewing gum in which the case is designed to use cakes or strips of chewing gum of conventional size.

A further object of the invention is to provide a dispensing case for chewing gum in which the case may readily be refilled.

A still further object of the invention is to provide a dispensing case for cakes or strips of chewing gum in which the case is of a simple and economical construction.

With these and other objects and advantages in view the invention embodies an elongated rectangular-shaped case having a base with upwardly extended end and side walls with longitudinally disposed grooves in upper edges of the side walls and with a cover having tongues extended into the grooves of the side walls whereby the cover is slidably mounted on the case and also providing means for dispensing cakes or strips of chewing gum therefrom.

Other features and advantages of the invention will appear from the following description taken in connection with the drawing, wherein.

Figure 1:
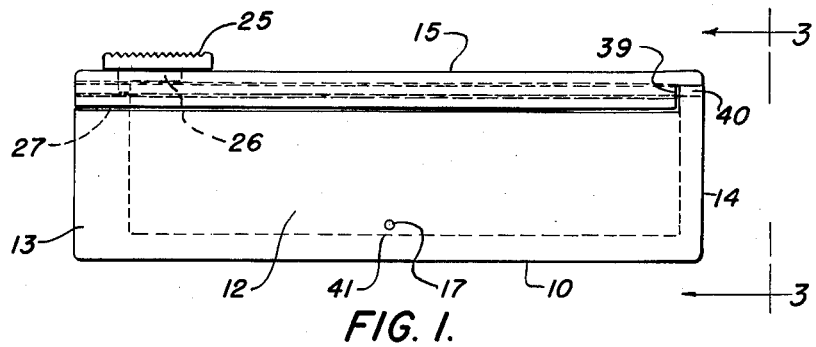
Figure 1 is a side elevational view illustrating the improved pocket chewing gum case.
Figure 2:
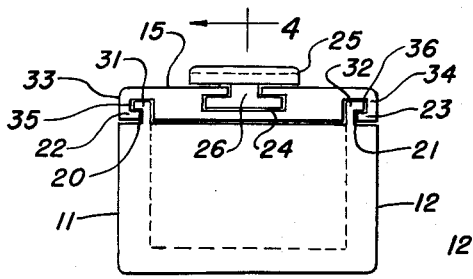
Figure 2 is an end elevational view of the chewing gum case looking toward the closed end thereof.
Figure 3:
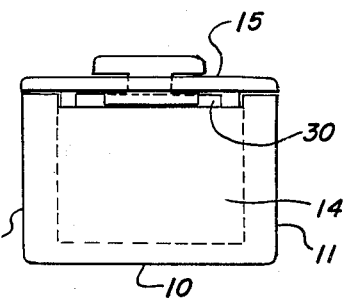
Figure 3 is an end elevational view of the chewing gum case looking toward the discharge end thereof in which an opening to provide passage for cakes or strips of chewing gum is provided, the view being taken on line 3—3 of Figure 1.
Figure 4:
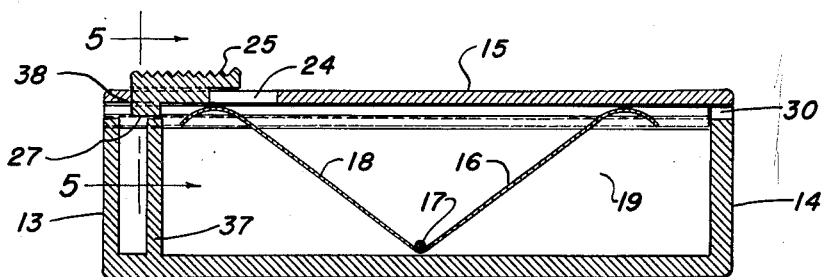
Figure 4 is a longitudinal section through the case taken on line 4—4 of Figure 2.
Figure 5:
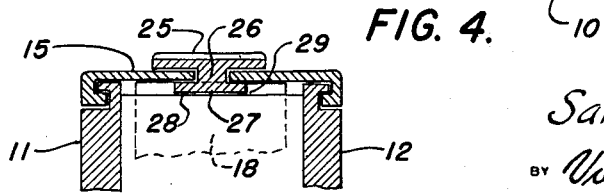
Figure 5 is a cross section through the upper portion of the case taken on line 5—5 of Figure 4 showing, in particular, the mounting of the cover on the case and also showing a button by which the cover is actuated mounted in the cover.

Referring now to the drawing wherein like reference characters denote corresponding parts the pocket gum case of this invention includes a base 10 having upwardly disposed side walls 11 and 12, end walls 13 and 14 and a cover 15, and the interior of the case is provided with a spring 16 secured in position by a pin 17 and having upwardly disposed arms 18 and 19 which are positioned to urge cakes or strips of chewing gum upwardly against the under surface of the cover 15.

The upper edges of the side walls 11 and 12 are provided with longitudinally disposed grooves 20 and 21 into which tongues 22 and 23 depending from edges of the cover 15 extend whereby the cover is slidably mounted on the case.

The cover 15 is also provided with a T-shaped slot 24 in which a button 25 is slidably mounted and the button is provided with a T-shaped stem 26 with a lug 27 having extensions 28 and 29 at the sides which retain the button in position in the cover.

With the button 25 slidably mounted in the slot 24 movement of the button toward the discharge end 14 of the case draws the lug 27 against the end of the uppermost cake or strip of chewing gum sliding the cake or strip of chewing gum through a slot 30 in the upper edge of the end wall 14. After discharging the cake or strip of chewing gum the button is withdrawn or moved toward the opposite end on which the wall 13 is positioned and the arms 18 and 19 of the spring move the cakes or strips of chewing gum resting upon the spring upwardly whereby the uppermost cake or strip thereof replaces the cake or strip discharged through the opening 30.

The side walls 11 and 12 are provided with upwardly extended tongues 31 and 32 that are positioned above the grooves 22 and 23 and flanges 33 and 34 on the edges of the cover are provided with grooves 35 and 36, respectively that are positioned to receive the tongues 31 and 32.

The end of the case on which the button is positioned is provided with a transversely disposed partition 37 which is spaced from the end wall 13 providing an opening 38 that is positioned to receive the lug 27 to permit the lug to pass beyond the ends of strips or cakes of chewing gum in the case.

The flanges 33 and 34 at the edges of the cover 15 are provided with notches 39 that are positioned to engage stops 40 positioned in the ends of the grooves 20 and 21 of the side walls 11 and 12, respectively.

Although it is preferred to make the case and cover of plastic it will be understood that the parts may be made of other suitable material and although the spring 16 is secured in the case by a transversely disposed pin 17, the ends of which extend into openings 41 in the side walls of the case, it will be understood that the spring may be retained in position by other means. The case may be transparent or of any suitable color.

It will be understood that modifications, within the scope of the appended claims, may be made in the design and arrangement of the parts without departing from the spirit of the invention.

What is claimed is:

1. A pocket gum case comprising a base having upwardly disposed side and end walls, the side walls having grooves in upper edges thereof, a cover having flanges with inwardly extended tongues thereon, depending from the sides, a T-shaped slot in the cover, a T-shaped button slidably mounted in the slot in the cover and having a projection depending from the under portion, and a spring in the case positioned to urge cakes of chewing gum in the case upwardly against the under surface of the cover and in the path of the projection depending from the button, the case having a discharge slot therein and said slot being positioned to receive cakes of chewing gum actuated by the projection of the button, a partition positioned in said case to provide an opening to receive said lug to permit the lug to pass beyond the ends of the cakes of gum.

2. In a case, the combination which comprises a base having upwardly disposed side and end walls, with a discharge opening in the upper portion of one end wall and with longitudinally disposed grooves in the outer surfaces of the upper edges of the side walls, a cover having tongues at the sides positioned to extend into the grooves in the upper edges of the side walls, a button having a T-shaped stem with a lug depending therefrom slidably mounted in the cover, means for resiliently urging cakes of chewing gum in the case upwardly in the path of the lug of the button and also in alignment with the discharge opening in the end wall of the case, a partition positioned in said case to provide an opening to receive said lug to permit the lug to pass beyond the ends of the cakes of gum.

3. In a pocket chewing gum case, the combination which comprises an elongated body having a base with upwardly extended side and end walls, one of said end walls having a discharge slot in the upper edge and the side walls having longitudinally disposed parallel grooves in the upper edges, a cover having depending flanges at the sides with tongues on inner surfaces of the flanges and positioned to extend into the grooves in the upper edges of the side walls, said cover having a T-shaped slot therein, a button slidably mounted in the slot of the cover and having T-shaped stem provided with a lug on the under surface, a spring mounted in the case and positioned to urge elongated strips of gum that are positioned in the case upwardly against the under surface of the cover and in the path of the lug depending from the button and also in alignment with the discharge slot in one of the end walls of the case, a partition positioned in said case to provide an opening to receive said lug to permit the lug to pass beyond the ends of the strips of gum.

References Cited in the file of this patent

UNITED STATES PATENTS

| | | |
|---|---|---|
| 676,876 | Chatfield | June 25, 1901 |
| 825,937 | Praschl | July 17, 1906 |